United States Patent
Fine et al.

(10) Patent No.: US 7,522,596 B2
(45) Date of Patent: Apr. 21, 2009

(54) ENHANCED DVMRP FOR DESTINATION-BASED FORWARDING OF MULTICAST DATA

(75) Inventors: Mark Fine, Salt Lake City, UT (US); Jeremy Garff, Sandy, UT (US); Kelly Marinan, Salt Lake City, UT (US)

(73) Assignee: Alcatel Lucent, Paris (FR)

( * ) Notice: Subject to any disclaimer, the term of this patent is extended or adjusted under 35 U.S.C. 154(b) by 847 days.

(21) Appl. No.: 10/751,153

(22) Filed: Dec. 31, 2003

(65) Prior Publication Data

US 2005/0083933 A1    Apr. 21, 2005

Related U.S. Application Data

(60) Provisional application No. 60/497,873, filed on Aug. 25, 2003.

(51) Int. Cl.
*H04L 12/56* (2006.01)
(52) U.S. Cl. ...................................... 370/390
(58) Field of Classification Search ........................ None
See application file for complete search history.

(56) References Cited

U.S. PATENT DOCUMENTS 5,517,494 A * 5/1996 Green ........................ 370/408
5,999,530 A * 12/1999 LeMaire et al. ............. 370/390

FOREIGN PATENT DOCUMENTS

WO    9851041 A    11/1998

OTHER PUBLICATIONS

Pusateri, Distance Vector Multicast Routing Protocol, Internet Draft, pp. 1-62, Aug. 1998.*
Pusateri juniper Networks T: "Distance Vector Multicast Routing Protocol" IETF Standard-Working Draft, Internet Engineering Task Force, IETF, CH, vol. idmr, No. 9, Sep. 1999, XP015018928.
Database Inspec [Online] The Institution of electrical Engineers, Stevenage, GB; Mar. 1998 Lai Y -C et al: "GMNF-DVMRP: an enhanced version of distance vector multicast routing protocol" XP002417836 Dtabase accession No. 6006019.

* cited by examiner

*Primary Examiner*—Frank Duong

(57) ABSTRACT

An enhanced DVMRP method for regulating multicast traffic in a destination-based forwarding router is disclosed. As a plurality of neighbor multicast routers are detected and route reports exchanged, the enhanced DVMRP router transmits one or more restricted route reports, each of the restricted route reports omitting the routes associated with one or more of its branch interfaces. With the exception of the neighbor router detected on a given interface, a route report omits reference to other branch interfaces to prevent branch-to-branch routing of multicast streams that may cause a destination-based forwarding router in a multi-access network to transmit duplicate packets to a group member. The enhanced DVMRP method also employs flash updates indicating that some branch interfaces are inaccessible in order to prevent multicast routing through newly-detected neighbor multicast routers.

8 Claims, 6 Drawing Sheets

ENHANCED DVMRP FOR DESTINATION-BASED FORWARDING OF MULTICAST DATA

CROSS-REFERENCE TO RELATED APPLICATION

This application claims the benefit of U.S. provisional application Ser. No. 60/497,873, entitled "DVMRP Modifications to Support Destination-based Forwarding Hardware," filed Aug. 25, 2003, the contents of which is hereby incorporated herein by reference for all purposes.

FIELD OF INVENTION

The invention generally relates to Internet Protocol (IP) multicast routing in a data network. In particular, the invention pertains to a method by which a multicast router can prevent loops and enhance stability in a multi-access, multicast network.

BACKGROUND

Multicast routing is the forwarding of Internet Protocol (IP) multicast packets based on the Distance Vector Multicast Routing Protocol (DVMRP) and Internet Group Management Protocol (IGMP). The DVMRP protocol is an Internet routing protocol that provides an efficient mechanism to dynamically generate IP multicast delivery trees while preventing multicast traffic from creating duplicate packets and routing loops in a network. A multicast delivery tree is used by a DVMRP router to distribute a multicast stream from a multicast source to multicast clients wishing to receive the stream without flooding the network with duplicate packets and without sending unwanted traffic into a network. Before building a multicast delivery tree, the multicast routers in the network exchange neighbor probe messages on local multicast-capable network interfaces that are configured to run DVMRP. A probe message sent by a given router on a particular interface includes its own IP address and the IP address of the neighbor DVMRP router, if known, from which the given router has received a probe message on the particular interface. In this manner, two neighboring multicast routers confirm their adjacency to each other and establish a peer relationship when each receives a probe message including its own address from the neighbor router. When a neighbor DVMRP router is detected, the local interface on which the DVMRP router is detected is referred to as a branch interface. In the absence of an adjacent DVMRP router, the interface is referred to as a leaf interface.

After a DVMRP router has identified its neighboring DVMRP routers, the router will transmit route report messages on those branch interfaces and accept route report messages from the neighboring routers. The initial route report message includes information on the DVMRP router's local interfaces. As the router learns of the other DVMRP routers in the network, the route report may include more detailed information about the routes reachable through the router and the associated cost metrics, e.g. a hop count. With the received route reports, a router constructs a DVMRP routing table from which the router can make forwarding decisions needed for various nodes. The routing table in conjunction with the cost metrics can be used to determine an optimal transmission path, i.e. a best route to the router from a multicast source. If the route that has already been advertised to a neighbor router later becomes inaccessible, a flash route report is sent indicating that the route is no longer accessible. The route reports are periodically refreshed at a report interval.

Even before the DVMRP router has compiled a complete routing table, the router may distribute a multicast stream to other nodes in the network including other DVMRP routers. Upon receipt of a multicast stream, a DVMRP router first performs a reverse path forwarding (RPF) check in which it determines from the DVMRP routing table whether the stream was received on the interface associated with the best route from the multicast source to the router. If the stream is not received on the associated interface, also referred to as the upstream interface, the packet is filtered to prevent a client in a multi-access network from receiving duplicate packets. If the multicast stream is received on the upstream interface, the DVMRP router is configured to propagate the multicast packets downstream to the outer edges of the network.

Upon receipt, the DVMRP router first broadcasts the multicast stream to branch interfaces associated with dependent routers and leaf interfaces from which the router has received an IGMP join message requesting the multicast stream. A dependent router is an adjacent downstream router that relies on a particular upstream router for receipt of a multicast transmission. If there is more than one upstream path to the source, the DVMRP router with the lowest metric to the source network is selected as the designated forwarder, which then assumes responsibility for forwarding data toward clients in the multi-access network. If there are two or more DVMRP routers with the lowest metric, the router with the lowest IP address is selected. The upstream router and designated forwarder(s) are generally determined for each combination of source and destination networks listed in the router's routing table. A dependent DVMRP router communicates its dependency on the upstream router by sending the upstream router a route report including a cost metric equal to the original cost metric received by the upstream router plus an "infinity," i.e., 32, value. Upon receipt of the report including a metric between infinity and twice infinity, i.e., 64, the upstream DVMRP router adds the downstream router to a list of dependent routers.

Each DVMRP router broadcasts the multicast stream to its dependent routers until the stream reaches one or more DVMRP routers at the edge of the network. At the edge routers, the multicast stream is transmitted to any multicast group members, i.e. clients, registered in the local group member database. In the absence of any clients, the edge router forwards a "prune" message to the upstream router to terminate the transmission to the particular downstream path. Other downstream DVMRP routers between the source and the router may forward the prune message upstream on the condition that there are no group members on the router leaf interfaces or group members accessible through a dependent router. Upon completion of the pruning, distribution of the multicast stream is limited to an optimal per-source-multicast delivery tree representing the best routes from a source to all members of a multicast group. At any point, a new client can request the multicast stream, causing its edge router to propagate a "graft" message upstream until a DVMRP router in possession of the multicast stream adds the appropriate branch to the multicast delivery tree. The multicast delivery tree is periodically refreshed as prune messages expire and the cycle of broadcasting and pruning repeated.

In order for one or more multicast streams to be efficiently distributed throughout the network without unnecessary duplication, DVMRP routers are generally required to make multicast forwarding decisions based on both the multicast destination IP address as well as the IP address of the multicast server at the source of the multicast stream. The source address in particular may be used to distinguish multicast streams having the same multicast group address but originating from different servers present in the multi-access network. In some multicast routers, however, the source address is ignored and only the destination group address and the incoming interface are used as criteria for routing multicast traffic. If uncorrected, such a router has the potential to cause multicast storms by improperly generating duplicate packets, thereby consuming network bandwidth and burdening network resources. There is therefore a need for a technique allowing such a multicast router to properly interoperate with a multicast network comprising DVMRP routers.

SUMMARY

The invention in the preferred embodiment features an enhanced DVMRP protocol for regulating multicast traffic in a destination-based forwarding router. As a plurality of neighbor multicast routers are detected and route reports exchanged, the enhanced DVMRP router transmits one or more restricted route reports, each of the restricted route reports omitting the routes associated with one or more of its branch interfaces. A route report, in particular, may omit reference to branch interfaces to prevent branch-to-branch routing of multicast streams that may cause a destination-based forwarding router in a multi-access network to transmit duplicate packets to a group member.

In some embodiments, the enhanced DVMRP router transmits a conventional DVMRP route report to the first neighbor multicast router it detects. As one or more additional neighbor multicast routers are detected on new branch interfaces, the enhanced DVMRP router transmits a flash update to the neighbor multicast routers previously detected. The flash report uses an unreachable metric for the new branch interface to prevent the enhanced DVMRP router from performing branch-to-branch multicast routing from the previously-detected neighbor multicast routers to the newly-detected neighbor multicast router. The enhanced DVMRP router also transmits a restricted route report to the new neighbor multicast router to prevent branch-to-branch multicast routing from the new neighbor multicast router to the previously-detected neighbor multicast routers.

In addition to preventing multicast looping, for example, the enhanced DVMRP protocol allows network architects to design redundancy into a network using destination-based forwarding routers. The DBF routers may be configured to have multiple branch interfaces while still routing data traffic to and from the leaf network to those interfaces.

BRIEF DESCRIPTION OF THE DRAWINGS

The present invention is illustrated by way of example and not limitation in the figures of the accompanying drawings, and in which.

DETAILED DESCRIPTION

Figure 1:
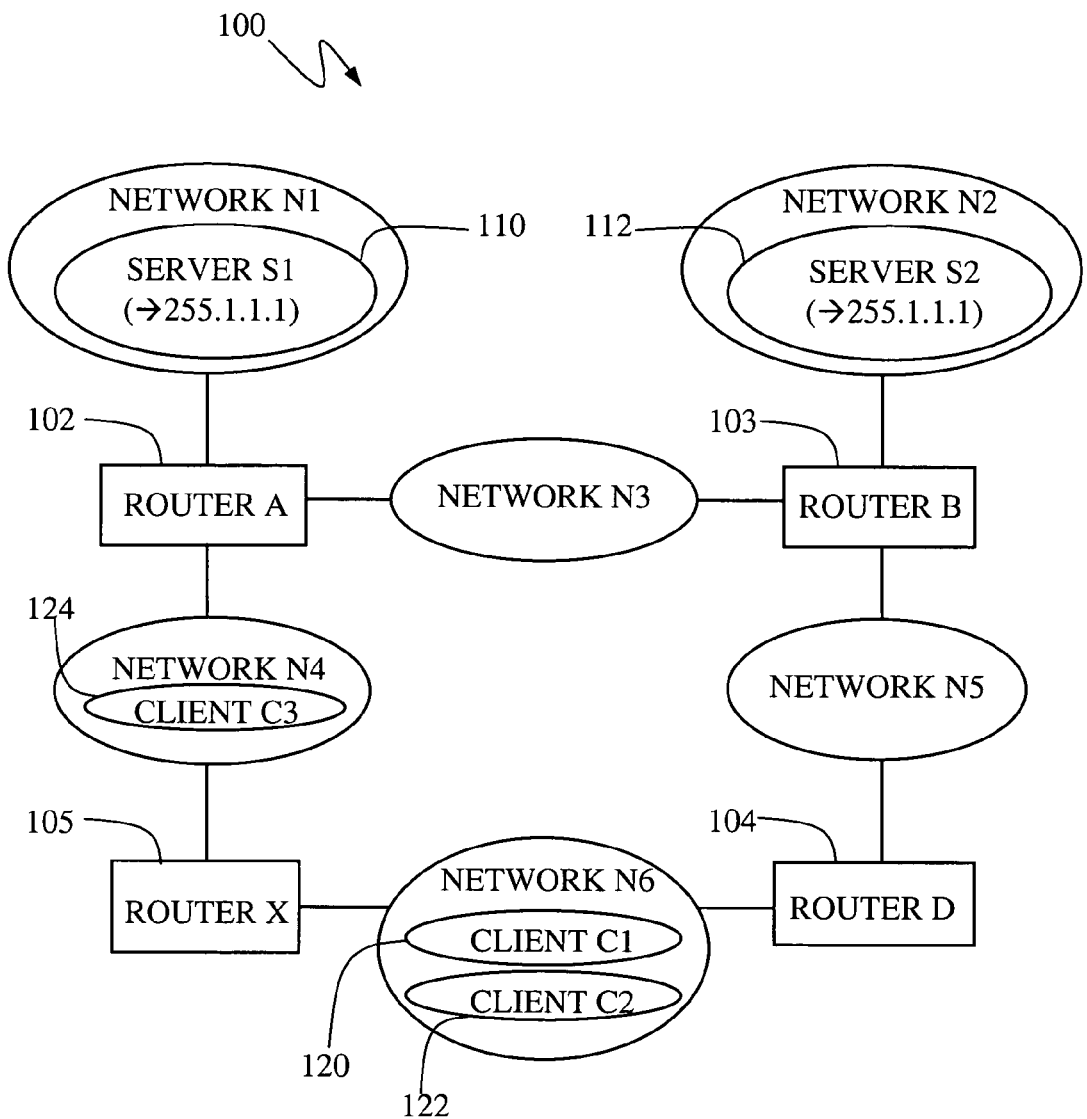
FIG. 1 is a functional block diagram of a multicast network with which the enhanced DVMRP router of the preferred embodiment may be employed.

Illustrated in FIG. 1 is a functional block diagram of a multicast network with which the enhanced DVMRP router of the preferred embodiment may be employed. The multicast network 100 preferably comprises a plurality of multicast routers including multicast router A 102, multicast router B 103, and multicast router D 104, each of which is enabled with the multicast routing protocol DVMRP. In the first example of two examples discussed below, the multicast router X 105 is a destination-based forwarding router unable to make multicast routing decisions based on the multicast source address. In a second example, router X 105 at the edge of the network 100 is enabled with an enhanced DVMRP protocol in accordance with the preferred embodiment.

The multicast network 100 further includes a plurality of multi-access network domains including network N1, N2, N3, N4, N5, N6, each of which may include one or more multicast group members, including clients 120, 122, 124 enabled with IGMP. For purposes of illustration, in both examples, the interface cost/metric for each router's 102-105 network connection is the same, e.g., a value of 1. The network N1 and network N2 in this example include a first multicast server S1 110 and second multicast server S2 112, respectively, that generate IP packets in the form of multicast streams characterized by a multicast group address, namely 255.1.1.1. The multicast network 100 and constituent networks N1-N6 may comprise or operably couple to one or more other communication network such as the Internet, a local area network (LAN), a wide area network (WAN), a metropolitan area network (MAN), or a combination thereof.

Figure 2:
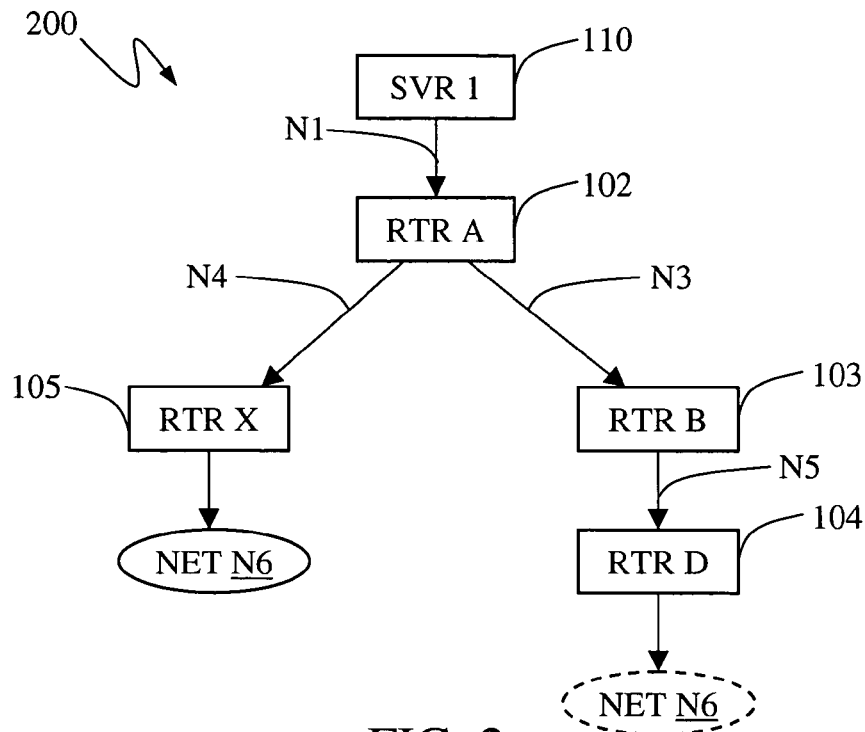
FIG. 2 is a per-source-broadcast tree for a first server in the multicast network implementing a standard destination-based forwarding router.
Figure 3:
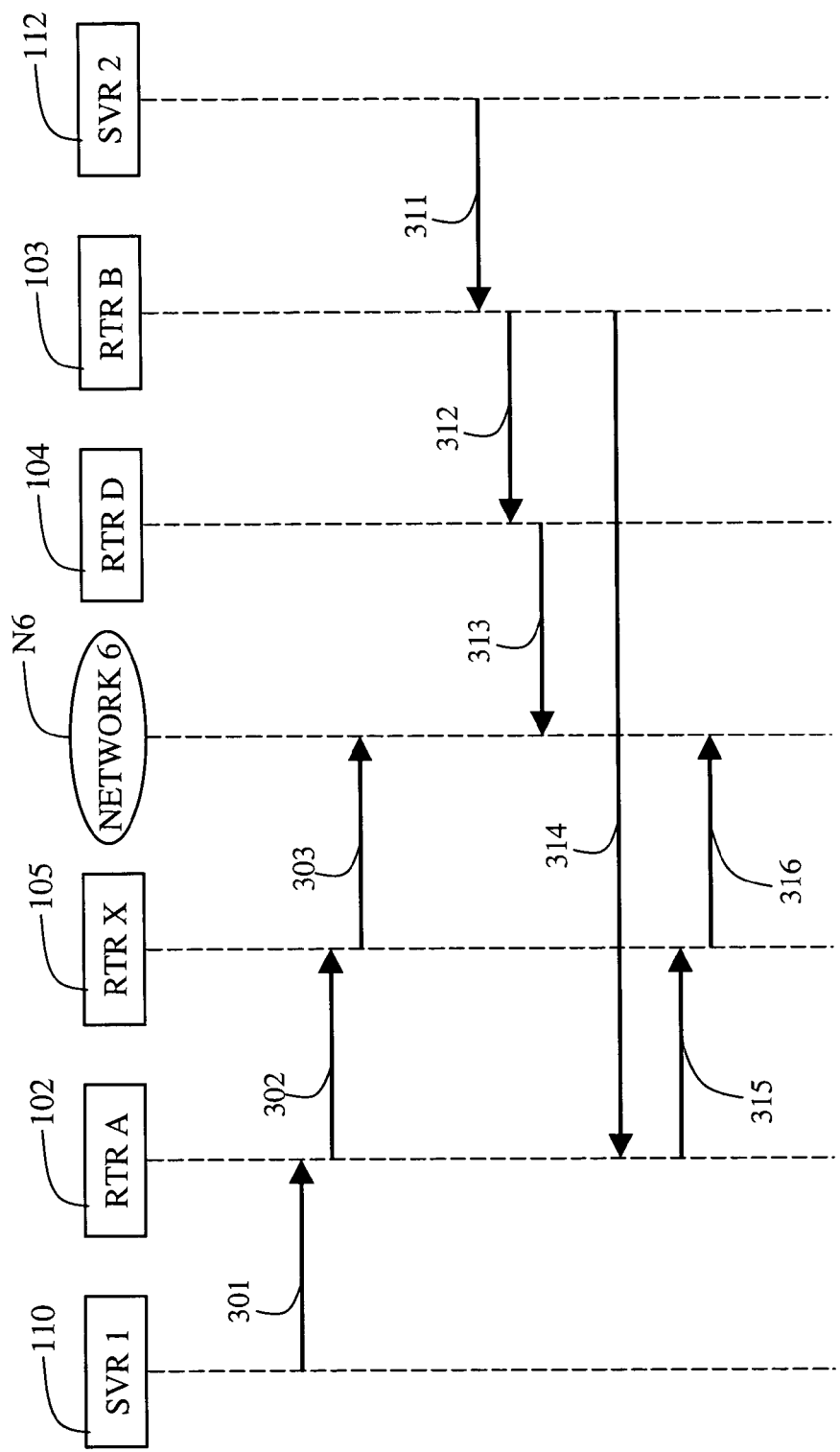
FIG. 3 is a multicast flow diagram including a first multicast data stream from the first server and a second multicast stream from a second server, in the multicast network implementing a standard destination-based forwarding router.
Figure 4:
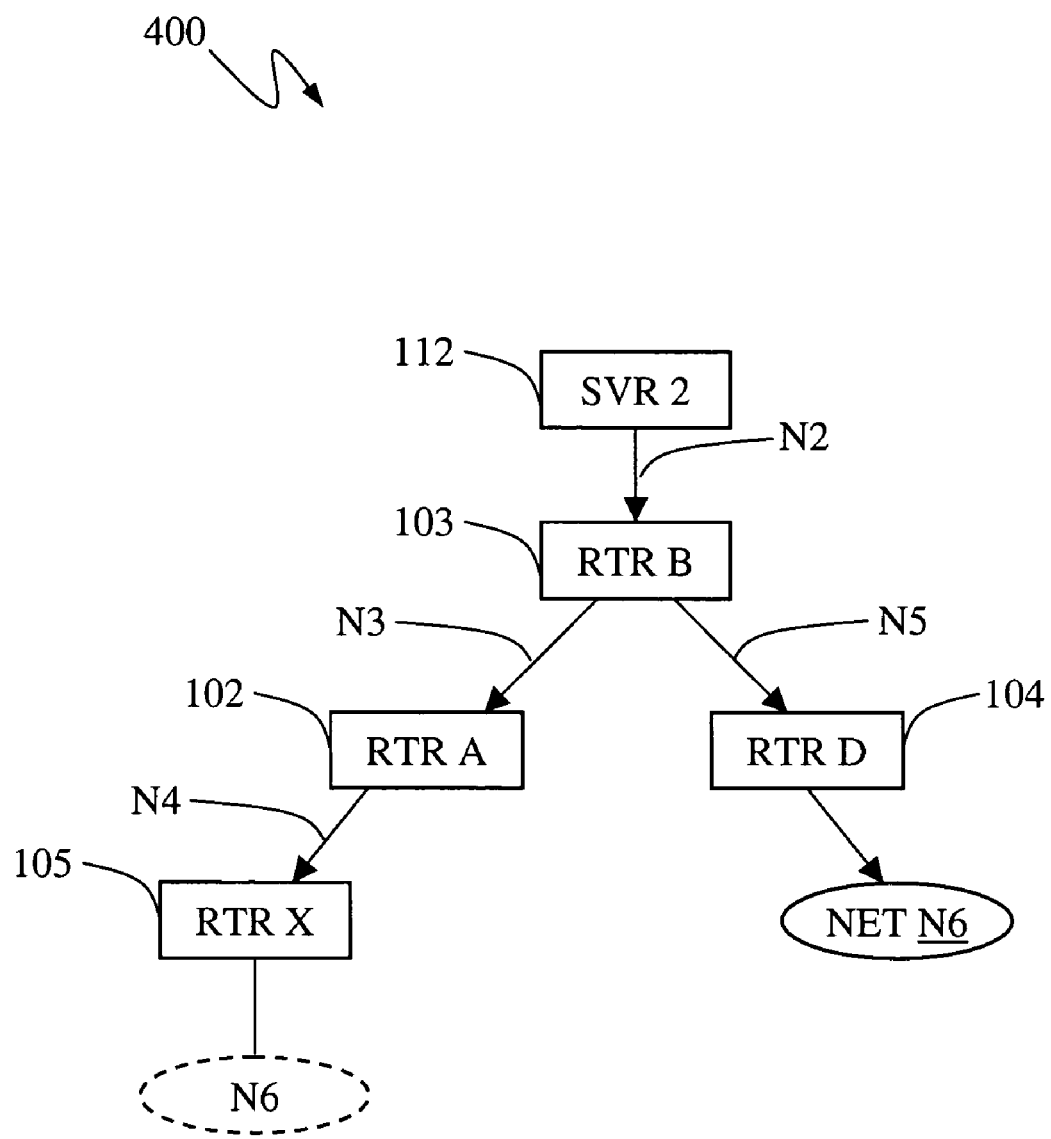
FIG. 4 is a per-source-broadcast tree for the second server in the multicast network.

With reference to FIGS. 2-4, the first example discussed immediately below demonstrates how a destination-based forwarding (DBF) router in the multicast network 100 may give rise to a multicast loop. It is assumed for purposes of this example only that router X 105 is a DBF router, while routers 102-104 are DVMRP routers able to perform routing using the multicast source address. A DBF router uses the destination group address and the incoming interface as criteria for routing multicast traffic and not the source address of the multicast server. Without the source address, a DBF router cannot distinguish a plurality of different multicast streams with the same multicast group address received on the same local interface, thereby potentially forwarding duplicate packets that may cause a multicast storm.

At start-up or initialization, the multicast routers 102-105 exchange probe messages, detect branch interfaces that link the routers, and establish peer relationships. Route reports are subsequently exchanged on those branch interfaces and per-source-broadcast trees compiled. The per-source-broadcast tree for server S1 110 in this example is illustrated in FIG. 2. In constructing the first server per-source-broadcast tree 200, the router X 105 and router B 103 typically express their dependency on router A 102 for traffic from network N1, i.e., server S1 110. Router D 104 also expresses its dependency on router B 103 for traffic from network N2. Although there are paths between router D 104 and first server S1 110 through both router X 105 and router B 103, router D 104 expresses dependency on router B 103 because it possesses a lower cost metric (i.e., minimizing hops, for example).

Assume for purposes of example that the first server 110 begins to transmit a first multicast stream having a multicast group IP address of 255.1.1.1. In accordance with the first server broadcast tree 200, the first multicast stream is broadcast from router A 102 to router X 105 and router B 103, and to router D 104 via router B 103. Although router D 104 also has access to network N6, router X 106 is elected the designated forwarder for clients on network N6. In the absence of any interested multicast group members, router D 104 sends prune message to router B 103. Router B 103, in turn, sends a prune message to router A 102 in the absence of any multicast group members in network N5 or any routers dependent on router B 103. Upon receipt of the prune message, router A 102 discontinues broadcasting the first multicast stream to the branch interface associated with network N3. Illustrated in FIG. 3 is the resulting multicast data stream distribution through the multicast network 100, a stream that includes the stream 301 to router A, stream 302 to router X, and stream 303 to the client C1 120 in the network N6.

In addition to the per-source-broadcast tree for server S1 110, the routers 102-105 also compile a per-source-broadcast tree for the second server S2 112. The per-source-broadcast tree for the second server S2 112 is illustrated in FIG. 4. In constructing the per-source-broadcast tree 400 for the second server S2 112, router A 102 and router D 104 express their dependency on router B 103 for traffic originating from N2, i.e. server S2 112. Although router X 104 is accessible through either router A 102 or router D 104, router X 105 expresses its dependency on router A 102 for multicast traffic from network N2 because router A's IP address is lower than router D's IP address .

Assume now for purposes of example that the second server 112 begins transmitting a second multicast stream while the first server S1 110 is still transmitting the first multicast stream, both streams having a multicast group IP address of 255.1.1.1. The packets sent from the second server S2 112 are not the same as that sent from the first server S1 110. In accordance with the second server broadcast tree 400, the second multicast stream is broadcast from router B 103 to router A 102 and router D 104, and from router A 103 to router X 106 and network N4. Although network N6 is accessible through router X 105, router D 104 is elected the designated forwarder for clients on N6 due to the lower cost metric through router D 106. Assuming client C2 122 in network N6 has advertised an IGMP join message for the second multicast stream from second server 112, router D 104 will refrain from sending prune message upstream. Similarly, an IGMP join message from client C3 124 in network N4 will prevent router A 102 from sending a prune message upstream. The resulting multicast data stream propagating in the multicast network 100, illustrated in FIG. 3, includes the stream 311 to router B, stream 312 to router D, and stream 313 to client C2 122 in network N6. The multicast stream 314 sent by router B 103 to router A 102 is forwarded to client C3 124 in network N4.

Unfortunately, the second multicast stream 315 from the second server S2 122 is visible to the DBF router X 105 on the same branch interface attached to network N4 with which it receives the first multicast stream 303 from the first server S1 120. If router X 105 were a standard DVMRP router, it would recognize that router D 104 is the designated forwarder for network N6 and refrain from forwarding the second multicast stream 316 to network N6. The router X 105, however, does not take into consideration the source IP address of server S2 122. Since the DBF router X 105 already has a forwarding entry installed in its hardware, it forwards every multicast packet destined to the multicast group IP address 255.1.1.1 arriving on this branch interface (connected to network N4) to network N6, including the multicast packets 316 from server S2 122. Consequently, client C2 122 receives duplicate packets 316 for the first multicast stream 313. The presence of duplicate packets results in routing loops that waste network bandwidth and can cause unnecessary work for other devices attached to the network.

Figure 5:
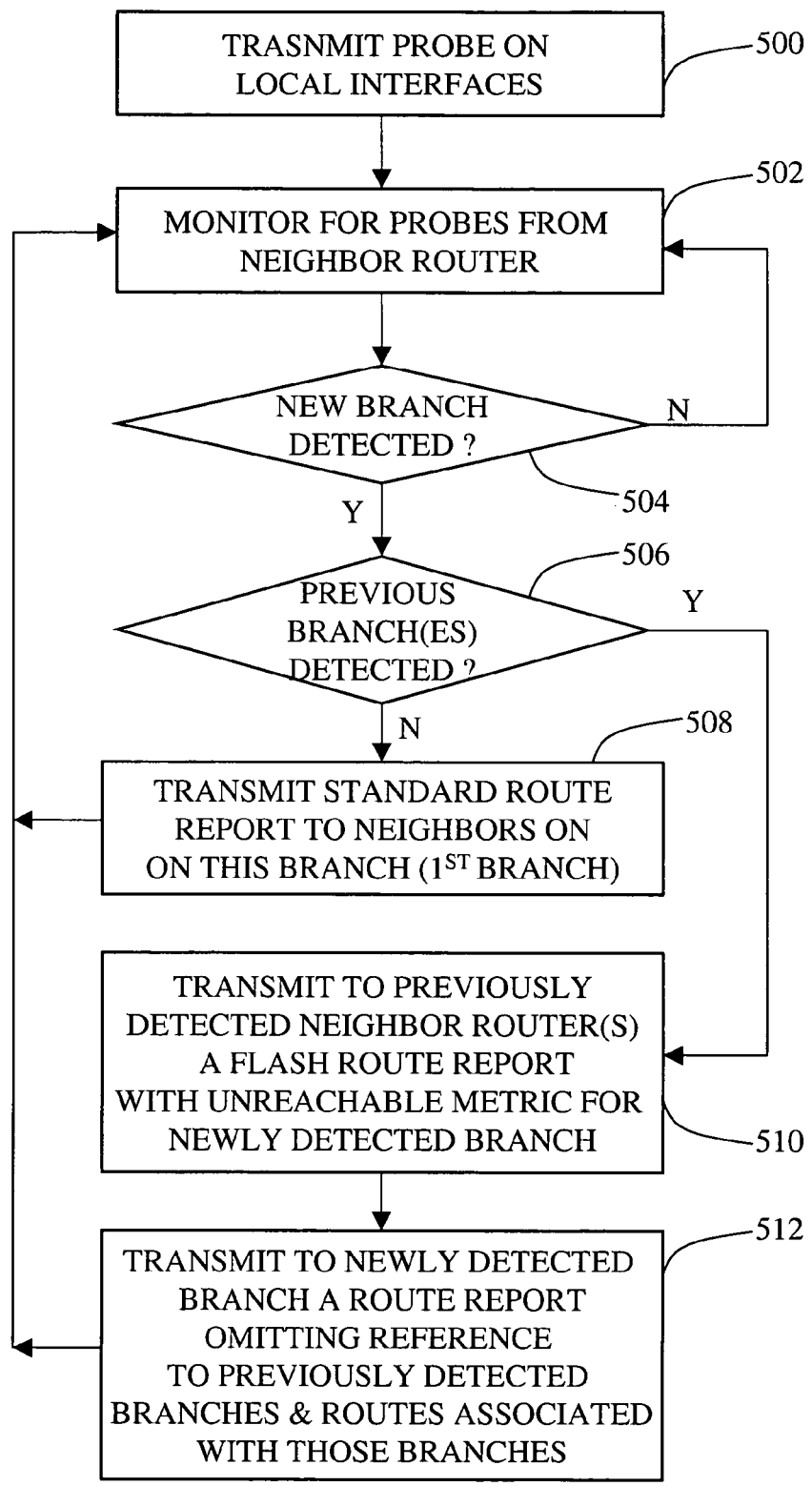
FIG. 5 is the enhanced DVMRP protocol, in accordance with the preferred embodiment of the present invention.

In order to avoid the problems that have plagued standard DBF routers in the first example above, the DBF router of the preferred embodiment and second example below employs an enhanced DVMRP (EDVMRP) protocol in order to reliably interoperate in a DVMRP network. Illustrated in FIG. 5 is the enhancement of the EDVMRP protocol of the preferred embodiment over the standard DVMRP protocol. Consistent with standard DVMRP routers, the EDVMRP router transmits DVMRP probe messages on its local interfaces (step 500) and monitors (step 502) those interfaces for DVMRP probe messages from neighbor multicast routers that are adjacent to the EDVMRP router or accessible via a multi-access network link. At startup, all DVMRP-enabled interfaces of the router are considered leaf interfaces. A leaf interface will not transition to branch interface until a neighbor multicast router is discovered on the interface. If a neighbor router is discovered on an interface, the router internally marks the interface as a branch interface.

When a probe message is received and a branch interface detected, the branch test 504 is answered in the affirmative. If the newly discovered neighbor router is the first branch detected or the only branch known to the router, the previous branch test 506 is answered in the negative. On the assumption that there is only one branch interface detected, the EDVMRP router transmits (step 508) a conventional route report addressed to the ALL_DVMRP_ROUTERS multicast address on what is now a known branch interface. Each subsequent neighbor discovery on that same branch interface will result in a unicast route report to the particular neighbor, at least until such time that the report interval has expired and the route reports again addressed to the ALL_DVMR-P_ROUTERS multicast address. The one or more route reports transmitted on the first branch interface comprise information on each of the EDVMRP router interfaces, which are at this point all leaf interfaces.

If the probe message received is detected on an interface other than the previously detected branch interface, the previous branch test 506 is answered in the affirmative. The EDVMRP router sends each previously detected neighbor multicast router (step 510) a DVMRP flash update to remove any local routes associated with the other DVMRP-enabled interfaces previously listed as being accessible through the newly detected branch interface and to remove any references to dependent multicast routers on the newly detected branch interface. In the preferred embodiment, removal is accomplished using a multicast transmission of an unreachability metric (32) in association with the newly detected branch.

The EDVMRP router also sends a restricted route report (step 512) on the newly detected branch interface. The restricted route report includes a listing of the routes accessible through the EDVMRP router's leaf interfaces along with the good cost metrics associated with those routes. The restricted route report, however, omits reference to one or more previously detected branches and the routes learned off of them. Future route report messages sent in accordance with the report interval also omit the references to routes reachable through any branch interface other than the branch on which the router report is being transmitted. The EDVMRP router continues to monitor for DVMRP Probe messages (step 502).

Since the routes associated with branch interfaces are no longer included in the outgoing route reports from the EDVMRP router, the neighbor multicast routers do not express dependency on the EDVMRP router. In the absence of the information of the branch interfaces represented in the multicast routing tables of the neighbor multicast routers, the EDVMRP router effectively prevents other routers from establishing a dependency, thereby avoiding the need to perform branch-to-branch routing of multicast traffic through the EDVMRP router. The neighbor routers will continue to learn about the routes at the leaf interfaces of the EDVMRP router and will expect traffic from those networks to be routed to them. One skilled in the art will recognize that the EDVMRP router of the preferred embodiment may still express a dependency upon its neighbors for multicast traffic. The neighbors will continue to route traffic towards the EDVMRP router, which in turn may forward it as needed to clients on its leaf interfaces. The EDVMRP router in the preferred embodiment is made to behave as a DVMRP router at the edge while eliminating multicast routing loops.

Figure 6:
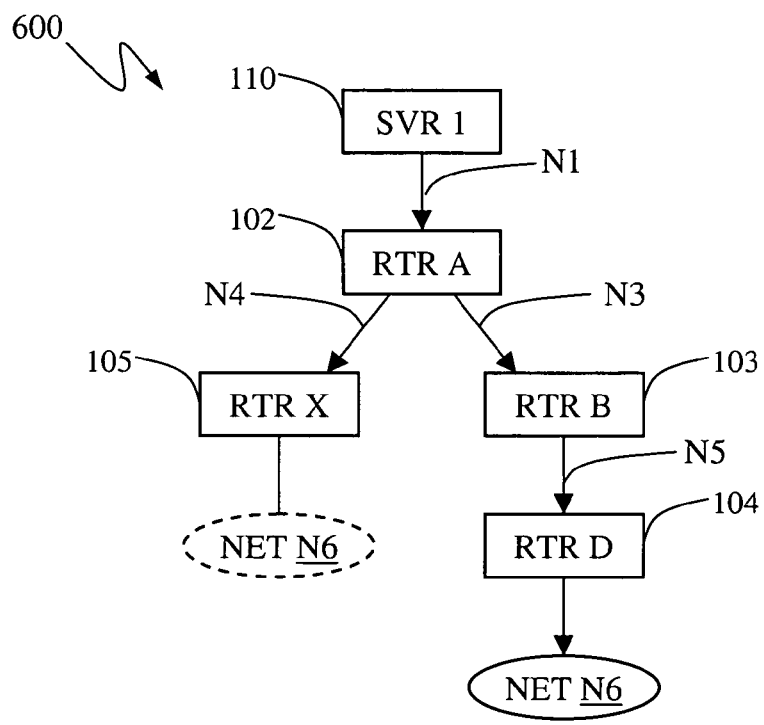
FIG. 6 is a per-source-broadcast tree for the first multicast server, in the multicast network including a destination-based forwarding router enabled with the enhanced DVMRP protocol of the preferred embodiment.
Figure 7:
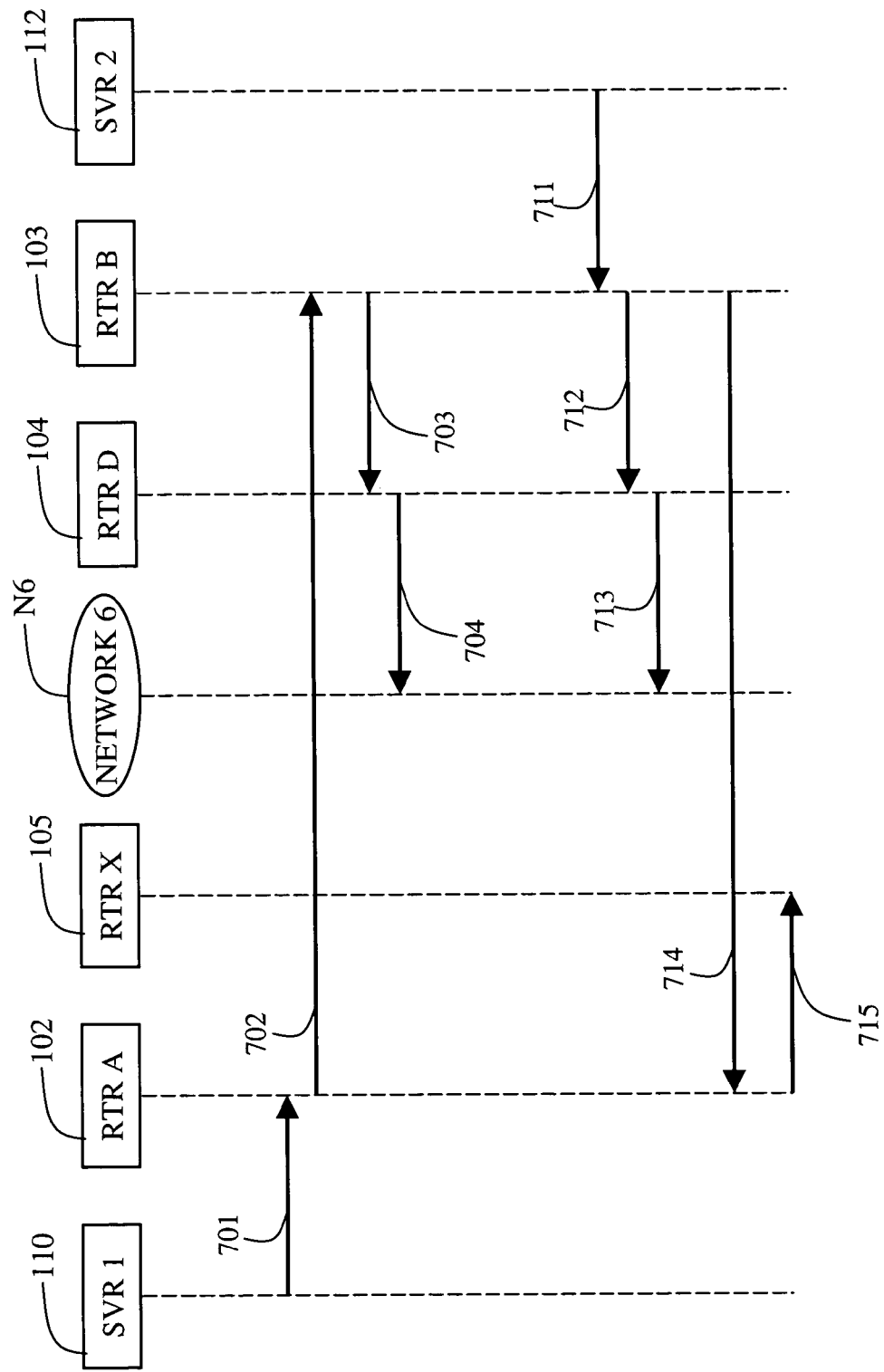
FIG. 7 is a multicast flow diagram including a first multicast data stream from the first server and a second multicast stream from the second server, in the multicast network including a destination-based forwarding router enabled with the enhanced DVMRP protocol of the preferred embodiment.

The manner by which the EDVMRP router of the preferred embodiment prevents multicast looping is illustrated by way of example. Assume for purposes of this example that the DBF router X 105 is a EDVMRP router present in the multicast network 100. When the routers 102-105 are initialized and the route reports and restricted route reports are exchanged, the routers 102-105 compile the per-source-broadcast tree for each of the multicast servers. The per-source-broadcast tree 600 for the first multicast server S1 110 is illustrated in FIG. 6. As before, router A 102 broadcasts the first multicast stream to router X 105 and to router B 103. Unlike the previous example, however, router D 104 recognizes itself as the designated forwarder for traffic from network N1 to network N6 because router X 105 failed to advertise to network N6 and router D that it had a better metric than router D, thereby preventing EDVMRP router X 105 from becoming the designated forwarder for client C1 120. Instead, the first multicast stream is forwarded by router B 103 to router D 104. Believing that traffic from network N1 is inaccessible through router X 105, router D 104 becomes the designated forwarder for client C1 120. As illustrated in the multicast flow diagram of FIG. 7, the first multicast stream 701 sent to client C1 120 includes a second stream 702 to router B 103, a third stream 703 to router D 104, and a fourth stream 704 forwarded to client C1 120 in network N6.

Assume now for purposes of this example that the second server 112 begins transmitting the second multicast stream while the first server S1 110 is still transmitting the first multicast stream, both streams having a multicast group IP address of 255.1.1.1. As described above, the broadcast distribution of the second multicast stream is in accordance with the per-source-broadcast tree of illustrated in FIG. 4. The multicast stream is then broadcast from router B 103 to router A 102 and router D 104, and to router X 106 via router A 103. Referring to the multicast flow diagram of FIG. 7, the resulting second multicast stream propagating in the multicast network 100 includes the stream 711 to router B 103, stream 712 to router D 104, stream 713 to client C2 122 in network N6, and stream 714 to router A 102. As before, router X 105 sees the stream 715 transmitted to client C3 124 but is prevented from forwarding the stream to client C1 120 in network N6 because of the EDVMRP router X 105 forwarding logic that bars branch-to-branch routing. By barring branch-to-branch multicast routing, the EDVMRP router X 105 avoids the multicast loop that occurred in the prior example employing the conventional DBF router. As a consequence, the multicast network 100 with the EDVMRP router X 105 eliminates duplicate packets and loops, thereby making the network substantially more stable.

In a second embodiment of the present invention, the EDVMRP router is adapted to permit a network administrator to toggle between the enhanced DVMRP mode discussed above and standard DVMRP.

One skilled in the art will also recognize that one or more steps practiced by the apparatus, module, or method of the present invention may be implemented in software running in connection with a programmable microprocessor; implemented in hardware utilizing either a combination of microprocessors or other specially designed application specific integrated circuits and programmable logic devices; or various combinations thereof. Thus, embodiments of the invention are not limited to any specific combination of hardware circuitry and software.

In some embodiments, the methods of the present invention are performed by an EDVMRP-enabled multicast router executing sequences of instructions retained in memory at the device or in another computer-readable medium. The term computer-readable medium as used herein refers to any medium that participates in providing instructions to one or more processors for execution. Such a medium may take many forms, including but not limited to, non-volatile media and volatile media. Non-volatile media includes, but are not limited to, hard disks, optical or magnetic disks, floppy disks, magnetic tape, or any other magnetic medium, CD-ROMs and other optical media, for example. The one or more processors and computer-readable medium may be embodied in one or more devices located in proximity to or remotely from the network administrator viewing the topology display.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

We claim:

1. An enhanced Distance Vector Multicast Routing Protocol (DVMRP) method for regulating one or more multicast streams in a first router, comprising the steps of:

transmitting, by the first router with local interfaces, a plurality of DVMRP probe messages on those local interfaces;

monitoring the local interfaces, by the first router, for DVMRP probe messages from neighboring multicast routers that are adjacent to the first router or are accessible via a multi-access network link;

if a DVMRP probe message is detected by the first router on an interface, marking internally, by the first router, that interface as a branch interface;

if the DVMRP probe message detected by the first router is the first branch detected, transmitting, by the first router, a route report to neighbors on the first branch;

if the DVMRP probe message detected by the first router is other than the first branch detected, transmitting, by the first router, to any previously detected neighbors, a flash router report with unreachable metric for the newly detected branch; and transmitting, by the first router, to the newly detected branch a route report omitting reference to the previously detected branches and routes associated with those branches.

2. The method in claim 1, and further wherein if the DVMRP probe message detected by the first router is the first branch detected, detecting subsequent neighbors on the same branch interface, and transmitting, by the first router, a unicast route report to each detected neighbor on the same branch interface.

3. The method in claim 1, and further wherein if the DVMRP probe message deteeted by the first router is the first branch detected, the branch interface being a leaf interface.

4. The method in claim 1, and further wherein if the DVMRP probe message detected by the first router is other than the first branch detected, transmitting, by the first router, a flash update to any previously detected neighbor multicast routers.

5. The method in claim 4, wherein said flash update at least for removing any local routes associated with other DVMRP enabled interfaces previously listed as being accessible.

6. The method in claim 5, wherein said flash update further at least for removing any references to dependent multicast routers on the newly detected branch.

7. The method in claim 1, wherein in said step of transmitting, by the first router, to the newly detected branch a route report omitting reference to the previously detected branches and routes associated with those branches, the route report includes a listing of the routes accessible through the interface of first router.

8. The method in claim 7, wherein in said step of transmitting, by the first router, to the newly detected branch a route report omitting reference to the previously detected branches and routes associated with those branches, the route report further includes the good cost metrics associated the routes accessible through the interface of the first router.

* * * * *